United States Patent [19]

Sutton

[11] 4,354,871

[45] Oct. 19, 1982

[54] CLEANER-POLISH COMPOSITIONS

[75] Inventor: David C. Sutton, Racine, Wis.

[73] Assignee: S. C. Johnson & Son, Inc., Racine, Wis.

[21] Appl. No.: 310,557

[22] Filed: Oct. 13, 1981

[51] Int. Cl.$^3$ ................................................ C09G 1/04
[52] U.S. Cl. ........................................ 106/3; 106/10; 106/11; 106/271; 106/311
[58] Field of Search ........................ 106/3, 11, 271, 270

[56] References Cited

U.S. PATENT DOCUMENTS 4,163,673  8/1979  Dechert et al. ...................... 106/270
4,265,663  5/1981  Gilicinski et al. ...................... 106/11

Primary Examiner—Theodore Morris

[57] ABSTRACT

An emulsion cleaner-polish for treating of furniture surfaces having excellent gloss and cleaning properties is described. The emulsion contains a film-former such as a silicone, wax, resin, non-drying oil, and mixtures thereof; a low level of a hydrocarbon solvent, water, a surfactant, and, as an essential component, an alpha-olefin having from 10 to about 18 carbon atoms. The alpha-olefin when present in fairly low levels strongly attacks oil-borne stains without substantial detriment to the gloss characteristics of the film. Additionally, the alpha-olefin contributes to the leveling characteristics of the cleaner-polish when applied to a substrate.

12 Claims, No Drawings

CLEANER-POLISH COMPOSITIONS

FIELD OF THE INVENTION

This invention relates to cleaner-polishes for household surfaces such as furniture. More particularly, this invention relates to cleaner-polish compositions which are water-in-oil or oil-in-water emulsions.

DESCRIPTION OF THE PRIOR ART

Various compositions, prepared and used in various forms including paste, solutions, lotions, creams and as emulsions, are known for cleaning and polishing of household items such as furniture. In recent years emulsion cleaner-polishes including those containing a relatively high-water content have been popular primarily because of the ease of application of such emulsions, particularly from pressurized containers.

Although emulsion type cleaner-polishes are popular and widely accepted, it is recognized in the art that to a certain extent there is a trade-off of desirable properties in such cleaner-polishes. Water-soluble deposits are readily removed by the relatively high amount of water in the emulsions. However, to remove oil-borne deposits the cleaner-polishes must contain a material such as a hydrocarbon or naphtha-type solvent to solubilize the oil-borne deposits. Additionally, however, it is necessary that the cleaner-polishes deposit a film which has good gloss characteristics, preferably a low luster or a dry shine appearance. Accordingly, a film-former must be incorporated into the water-in-oil or oil-in-water emulsion. The film-former must be compatible with the water and the hydrocarbon-type solvents, and must provide a film with the desired gloss without deposit of too much of the film-former on the surface of the furniture so as to prevent unacceptable build-up of the film-former on the furniture surface which could detract from the appearance of the furniture surface.

To meet the essential requirements of the cleaner-polish, it has been customary in the art to utilize in the cleaner-polish a combination of water, naphtha or hydrocarbon-type solvents, surfactants and film-formers in carefully controlled amounts so that the cleaner-polish will adequately remove oil-borne deposits without substantial detriment to the gloss characteristics of the deposited film. Usually there has been some sacrifice in either the gloss or removal of oil-borne deposits in such systems. There is need, therefore, for a cleaner-polish having improved cleaning of oil-borne deposits without detracting from the gloss characteristics of the film.

OBJECTS OF THE PRESENT INVENTION

It is a primary object of the present invention to provide a high-water content emulsion cleaner-polish which provides improved cleaning of oil-borne stains or deposits, and which deposits only low amounts of a film-former having superior gloss characteristics.

It is a further object of the present invention to provide high-water content emulsion cleaner-polishes which provide good cleaning of oil-borne stains or deposits on furniture while having a relatively low level of hydrocarbon-type solvent.

Other objects of the present invention will be set forth in, or will be apparent from the following description of the invention.

SUMMARY OF THE INVENTION

The emulsion cleaner-polishes of the present invention utilize as essential ingredients water, naphtha or hydrocarbon-type solvents, surfactants, film-formers, and as an essential component relatively low amounts, i.e., from about 0.5 to 6 percent by weight, of an alpha-olefin having from 10 to about 18 carbon atoms. It has been found that the alpha-olefins are fully compatible with the other essential components of the cleaner-polish composition and particularly with the emulsified hydrocarbon solvent and water. The alpha-olefins permit the use of lower amounts of the hydrocarbon or naphtha-type solvent while providing superior cleaning and leveling characteristics. The alpha-olefins, although providing superior cleaning and leveling characteristics, do not detrimentally affect the gloss characteristics of the conventional film-formers such as silicones, waxes, mineral oils, and resins, or combination thereof.

The emulsions of the present invention include both water-in-oil and oil-in-water emulsions, but preferably are the oil-in-water or "water-out" emulsions. The emulsions can be applied from a pressurized system containing an appropriate amount of liquid or gaseous propellant, or with mechanical spray means such as the conventional pump sprayers; or they may be applied to a furniture surface with a polishing cloth or other suitable means.

DETAILED DESCRIPTION OF THE INVENTION

The present invention embraces water-in-oil and oil-in-water emulsions having a high-water content of the type used to clean and polish furniture. The compositions include as essential components, on a weight basis, from about 66 to about 97 percent water; from about 1.0 to about 25 percent hydrocarbon solvent; from about 0.2 to about 1.20 percent surfactants; from about 1.0 to about 5 percent film-formers, and from about 0.5 to about 6 percent of an alpha-olefin having from 10 to about 18 carbon atoms. In the composition of this invention the hydrocarbon solvent, surfactants, and film-formers are those conventionally used in cleaner-polishes; however, in most cases, not in the same amounts. The critical component insofar as the present invention is concerned is the alpha-olefin. It has been discovered that the presence of the alpha-olefin, when used in an amount of from about 0.5 to about 6.0 percent by weight of the total composition, permits a substantial reduction in the amount of hydrocarbon solvent employed. This is advantageous in that the hydrocarbon solvents, in the past necessary in substantial amounts for good removal of oil-borne deposits, have a substantial adverse effect on the gloss characteristics of the film-formers. The presence of the alpha-olefin and a consequent reduction in the amount of hydrocarbon solvent used, while imparting improved cleaning does not detract substantially from the gloss characteristics of the film-former. This permits use of the low levels of film-formers in the composition, thus necessitating the deposit of only low levels of film-formers on the furniture surface to obtain the essential gloss characteristics, thereby precluding substantial build-up of the film-former on the furniture surface. Additionally, the alpha-olefin contributes favorably to the leveling characteristics of the cleaner-polish composition.

The alpha-olefins which are used according to the present invention are commercially available materials marketed under the tradename "Gulftene" by the Gulf Oil Company. For example, Gulftene 12 is the tradename for 1-dodecene or $C_{12}$ alpha-olefin. The alpha-olefins which are used according to the present invention have from 10 to about 18 carbon atoms. Below 10 carbon atoms the alpha-olefins are too volatile for use and, further, have insufficient cleaning power for oil-borne deposits. Alpha-olefins having more than about 18 carbon atoms, while having adequate cleaning power for removal of oil-borne deposits, cause the cleaner-polish composition to smear when applied to a furniture surface, detracting from its usefulness. Generally speaking, the higher the carbon content between the range of $C_{10}$ and $C_{18}$, the greater the cleaning power.

It has been found that, particularly for oil-in-water (i.e., "water-out") emulsions, the $C_{12}$ alpha-olefin is preferred. The $C_{12}$ alpha-olefin provides good cleaning characteristics; and, further, the cleaner-polish containing the $C_{12}$ alpha-olefin provides a low luster, dry shine finish. The low luster, dry shine appearance is a desirable attribute in the cleaner-polish. In contrast to the $C_{12}$ alpha-olefins, alpha-olefins having from 13 to 15 carbon atoms in the molecule, while also having excellent cleaning characteristics, provide a shiny or oily appearance in the deposited film. Accordingly, the alpha-olefin within the range of $C_{10}$ to $C_{18}$ alpha-olefin will be chosen depending upon the gloss and cleaning characteristics desired in the finished product. For "water-out" emulsion compositions, the preferred range of alpha-olefins in the composition is from about 2.50 to about 6.0 percent on a weight basis. For "oil-out" emulsion cleaner-polishes, the preferred range of alpha-olefin in the cleaner-polish composition is from about 3.0 to 5 percent. However, the percentages of materials designated hereinbefore are operable and provide useful cleaner-polishing composition.

The hydrocarbon solvents useful in accordance with the present invention are those conventionally employed in furniture polishes and have a kauri-butanol value of from about 20 to about 50, and have boiling ranges which lie within the range of about 80° to 200° C., and preferably lie within the range of 95° to 150° C. Isoparaffinic hydrocarbon solvents such as those commercially available from Exxon Corporation under the tradename Isopar, and the Soltrols commercially available from the Phillips Petroleum Corporation are preferred in that they are substantially odor-free. The hydrocarbon solvent can be present in the range, as hereinbefore stated, of from about 1 to 25 percent by weight based on the total weight of the cleaner-polish compositions. Preferably, however, the hydrocarbon solvents will be present in an amount of from about 1.0 to 4 percent in a "water-out" emulsion composition, and in the amount of from about 1 to 25 percent in an "oil-out" emulsion composition. Generally speaking, the amount of hydrocarbon solvent utilized is lower in view of the increased cleaning power of the alpha-olefin employed in accordance with the present invention.

The film-formers useful in accordance with the present invention are those film-formers conventionally employed in cleaner-polish compositions having a high-water content and include the organic polysiloxanes, waxes, polymeric compositions, resins, and non-drying oils. Preferred film-formers for the oil-in-water or "water-out" emulsion compositions are the organic polysiloxanes including polydialkyl siloxane, polyalkylaryl siloxane, and polydiaryl siloxane. Polysiloxanes such as polydimethyl siloxane, polydiethyl siloxane, polymethylethyl siloxane, polymethylphenyl siloxane, and compolymers of two or more of such siloxanes are exemplary of the materials which can be used. Polydimethyl siloxane is especially preferred, particularly combinations of the polydimethyl siloxanes having different viscosities ranging at from about 5 to 50,000 centistokes, and preferably at from about 100 to 10,000 centistokes. The film-former can also be or include a natural or synthetic wax. Waxes which are suitable include the synthetic waxes such as the microcrystalline waxes and petroleum waxes, or the natural waxes such as candelilla and carnauba waxes. Resinous materials can also be usefully employed such as the polyethylene and polypropylene resins. In addition to the silicones, waxes, and resins, non-drying oils can be used as the film-former either alone or in combination with the silicones, waxes, and resins. Examples of suitable non-drying oils include the heavy and light mineral oils commercially available under the tradenames Marcol or Primol from the Exxon Corporation. As stated hereinbefore, the film-former can be present in an amount of from about 1.0 to 5 percent. In "water-out" or oil-in-water emulsions, the film-former which is preferably a polysiloxane or combination of the polysiloxane and mineral oil and/or waxes is present in an amount of from about 1 to 4 percent by weight based on the total weight of the composition. In "oil-out" or water-in-oil emulsions, the film-former is preferably a combination of waxes and polysiloxanes, and preferably are present in an amount of from about 3 to 5 percent by weight based on the total weight of the composition.

The emulsifiers or surfactants which are useful in accordance with the present invention are the non-ionic emulsifiers, cationic emulsifiers, and anionic emulsifiers commonly employed in cleaner-polishes for application to furniture surfaces. In a "water-out" system, the non-ionic emulsifiers or combinations of non-ionic emulsifiers are preferred in that they provide good emulsion stability. Exemplary of the non-ionic emulsifiers which can be employed herein include sorbitan esters of oleic, stearic, isostearic, palmitic and lauric acids; polyethoxylated sorbitan esters having up to 20 ethoxy units; polypropoxylated sorbitan esters having up to 20 propoxy units, and the mono- and di-glycerides of fat-forming fatty acids. The non-ionic emulsifiers are exemplified by the Span and Tween emulsifiers available commercially from ICI Americas, Inc. Examples of the cationic emulsifiers useful in this invention include the quaternary ammonium compounds such as quaternary ammonium halides, quaternary ammonium sulfates, the fatty amines which are ethoxylated with from 2 to 10 moles of ethylene oxides, and the chloride or acetate salts of amines or amines which are ethoxylated with 2 or more moles of ethylene oxide. The anionic emulsifiers which are useful in accordance with the present invention include the sulfates, such as sodium lauryl sulfate, or sodium alkyl ether sulfates; the sulfosuccinates including the sulfosuccinates containing polyethylene glycol moieties attached thereto, as well as the alkyl aryl sulfonates. The selection of the emulsifier or surfactants will be determined in part by the particular film-formers utilized in the cleaner-polishing composition. As stated hereinbefore, the surfactant can be present at from about 0.2 to 1.20 weight percent based on the total weight of the composition. In "water-out" or oil-in-water emulsions, the surfactant will preferably be present in an amount of from about 0.6 to 1.2 weight percent; whereas in the "oil-out" or water-in-oil emulsions, the surfactants are preferably present in an amount of from about 0.5 to 1 percent.

In addition to the aforesaid ingredients, minor amounts of preservatives and fragrance can be utilized in the composition to provide improved stability of the compounds and to impart a desirable odor. Preservatives such as formaldehyde and the quaternary materials are commonly employed in the cleaner-polishing compositions.

The cleaner-polishes are prepared using conventional emulsification techniques. One acceptable technique for preparing water-in-oil emulsions is to charge the film-forming constituents, the emulsifiers, and the hydrocarbon solvent into a vessel and heat until the solids are melted and blended homogeneously in the vessel. Water is charged to the vessel and minor amounts of the preservatives are gradually added to the vessel with vigorous agitation. The composition is cooled to approximately ambient temperature, followed by homogenizing with a suitable homogenizer such as a Manton-Gaulin, or similar homogenizers. If desired, a fragrance can be added by cold-blending with the cleaner-polish intermediates. An acceptable technique for preparing oil-in-water emulsions is to charge the film-forming constituents, the emulsifiers, fragrance, if employed, and the hydrocarbon solvent into a vessel and heat until the solids are melted and homogeneously blended to provide a hot-oil phase. The hot-oil phase is then added to a vessel containing the hot-water phase which includes water and preservatives. The mixture is homogenized with a suitable homogenizer, and thereafter cooled to ambient temperature. The emulsion composition can be packaged in bottles and/or cans, or other container at ambient pressure for application with polishing cloths or the like. Alternatively, the emulsion composition can be charged to an aerosol-type pressure package with a suitable propellant. Pressure packaging of the cleaner-polish composition can be accomplished, for example, by charging aerosol cans using standard aerosol charging techniques with from about 5 to 30 percent by weight of hydrocarbon liquid propellants, or other liquid propellants such as dimethyl ether, and from about 95 to 70 percent of the polish composition as described herein. As an alternative, compressed gases such as carbon dioxide and nitrous oxide may be used for pressure packaging. A wide variety of other packaging techniques may also be used, including packaging the cleaner-polish in a container having a mechanical-type sprayer. These features being well known to those skilled in the art will not be elaborated on herein.

Preferred and exemplary embodiments of the present invention which establish the significance of the alpha-olefin in the cleaner-polish composition are set forth in Tables I and II. The examples of Table I are oil-in-water or "water-out" emulsions. The examples of the cleaner-polishes set forth in Table II are "oil-out" or water-in-oil emulsions. The compositions of Table II are packaged in aerosol containers utilizing a propellant which is a mixture of propane and isobutane in equal amounts.

TABLE I

| | Example No. | | | | | | | | | |
|---|---|---|---|---|---|---|---|---|---|---|
| | 1* % wt | 2 % wt | 3* % wt | 4 % wt | 5* % wt | 6 % wt | 7 % wt | 8 % wt | 9* % wt | 10 % wt |
| Span 20 | 0.50 | 0.50 | 0.50 | 0.50 | 0.50 | 0.50 | 0.50 | 0.50 | 0.50 | 0.50 |
| Tween 20 | 0.50 | 0.50 | 0.50 | 0.50 | 0.50 | 0.50 | 0.50 | 0.50 | 0.50 | 0.50 |
| Fragrance | 0.35 | 0.35 | 0.30 | 0.30 | 0.30 | 0.30 | 0.30 | 0.30 | 0.30 | 0.30 |
| Formaldehyde | 0.25 | 0.25 | 0.25 | 0.25 | 0.25 | 0.25 | 0.25 | 0.25 | 0.25 | 0.25 |
| Quaternary BTC-2125 M | 0.15 | 0.15 | 0.15 | 0.15 | 0.15 | 0.15 | 0.15 | 0.15 | 0.15 | 0.15 |
| Isopar C | 1.00 | — | — | — | — | — | — | — | — | — |
| Isopar E | — | — | 1.00 | — | 1.00 | 1.00 | 1.00 | 1.00 | 1.00 | 1.00 |
| $C_{12}$ α-olefin | — | 1.00 | — | 1.00 | — | 3.00 | 5.00 | 2.50 | — | 2.50 |
| Water | 93.65 | 93.65 | 96.30 | 96.30 | 96.30 | 93.30 | 91.30 | 92.30 | 92.30 | 93.30 |
| Microwax | 0.35 | 0.35 | — | — | — | — | — | — | — | — |
| Hoechst Wax KSL | 0.10 | 0.10 | — | — | — | — | — | — | — | — |
| Marcol 70 | — | — | — | — | — | — | — | 1.50 | 4.00 | 1.50 |
| Primol 185 | 0.75 | 0.75 | — | — | — | — | — | — | — | — |
| Polydimethyl Silicone (1,000 ctsk) | 1.20 | 1.20 | 1.00 | 1.00 | — | — | — | 1.00 | 1.00 | — |
| Polydimethyl Silicone (10,000 ctsk) | 1.20 | 1.20 | — | — | — | — | — | — | — | — |
| Alkyl Aryl Modified Silicone | — | — | — | — | 1.00 | 1.00 | 1.00 | — | — | — |
| | 100.00% | 100.00% | 100.00% | 100.00% | 100.00% | 100.00% | 100.00% | 100.00% | 100.00% | 100.00% |

Key to Table I
Examples marked with asterisk (*) are comparative compositions.
Span 20 is a sorbitan monolaurate non-ionic surfactant marketed by ICI Americas, Inc.
Tween 20 is a polyethylene oxide sorbitan monolaurate non-ionic surfactant marketed by ICI Americas, Inc.
Quaternary BTC-2125 M is a quaternary ammonium preservative.
Isopar C and Isopar E are isoparaffinic hydrocarbon solvents, substantially odor free, marketed by Exxon Corp.
Hoechst Wax KSL is a montan wax marketed by the Hoechst Co.
Marcol 70 and Primol 185 are high-grade mineral oils differing in viscosity marketed by Exxon Corp.

TABLE II

| | Example No. | | | | | | | | |
|---|---|---|---|---|---|---|---|---|---|
| | 11 % wt | 12 % wt | 13 % wt | 14 % wt | 15 % wt | 16 % wt | 17 % wt | 18 % wt | 19 % wt |
| Span 80 | 0.465 | 0.93 | 0.93 | 0.93 | 0.93 | 0.93 | 0.93 | 0.93 | 0.93 |
| Tween 80 | 0.035 | 0.07 | 0.07 | 0.07 | 0.07 | 0.07 | 0.07 | 0.07 | 0.07 |
| Fragrance | 0.35 | 0.35 | 0.35 | 0.35 | 0.35 | 0.35 | 0.35 | 0.35 | 0.35 |
| Formaldehyde | 0.20 | 0.20 | 0.20 | 0.20 | 0.20 | 0.20 | 0.20 | 0.20 | 0.20 |
| Water | 79.95 | 73.45 | 74.45 | 73.95 | 74.95 | 74.95 | 74.95 | 66.65 | 66.65 |
| $C_{12}$ α-olefin | 5.00 | 5.00 | 5.00 | 5.00 | 5.00 | 5.00 | 5.00 | 3.00 | 3.00 |
| Isopar C | — | — | — | — | — | 5.00 | 10.00 | 25.00 | — |

TABLE II-continued

| | Example No. | | | | | | | | |
|---|---|---|---|---|---|---|---|---|---|
| | 11 % wt | 12 % wt | 13 % wt | 14 % wt | 15 % wt | 16 % wt | 17 % wt | 18 % wt | 19 % wt |
| Isopar E | 10.00 | 15.00 | 15.00 | 15.00 | 15.00 | 10.00 | 5.00 | — | 25.00 |
| Polydimethyl Silicone (100 ctsk) | — | — | — | — | 1.50 | 1.50 | 1.50 | 1.50 | 1.50 |
| Polydimethyl Silicone (1,000 ctsk) | — | — | — | — | 1.50 | 1.50 | 1.50 | 1.50 | 1.50 |
| Dow Corning 230 Fluid | 3.00 | 4.00 | 4.00 | 4.00 | — | — | — | — | — |
| Primol 185 | — | — | — | 0.50 | — | — | — | — | — |
| Paraffin Wax | — | — | — | — | — | — | — | — | — |
| Microwax | 0.50 | 0.50 | — | — | 0.50 | 0.50 | 0.50 | 0.80 | 0.80 |
| Hoechst Wax XL-165-J | — | — | — | — | — | — | — | — | — |
| Hoechst Wax KSL | 0.50 | 0.50 | — | — | — | — | — | — | — |
| | 100.00% | 100.00% | 100.00% | 100.00% | 100.00% | 100.00% | 100.00% | 100.00% | 100.00% |
| Finished Product | | | | | | | | | |
| Intermediate | 90.0 | 90.0 | 90.0 | 90.0 | 90.0 | 90.0 | 90.0 | 90.0 | 90.0 |
| Propellant | 10.0 | 10.0 | 10.0 | 10.0 | 10.0 | 10.0 | 10.0 | 10.0 | 10.0 |
| | 100.0% | 100.0% | 100.0% | 100.0% | 100.0% | 100.0% | 100.0% | 100.0% | 100.0% |

Key to Table II
Span 80 is a sorbitan monooleate non-ionic surfactant marketed by ICI Americas, Inc.
Tween 80 is a polyethylene oxide sorbitan monooleate non-ionic surfactant marketed by ICI Americas, Inc.
Isopar C and Isopar E are isoparaffinic hydrocarbon solvents, substantially odor free, marketed by Exxon Corp.
Dow Corning 230 Fluid is an organo-modified polysiloxane (alkyl aryl polysiloxane) marketed by Dow Corning Corp.
Primol 185 is a high-grade mineral oil marketed by Exxon Corp.
Hoechst Wax XL-165-J is a synthetic wax derived from an alpha-olefin polymer marketed by the Hoechst Co.
Hoechst Wax KSL is a montan wax marketed by the Hoechst Co.

Referring to Table I:

Examples 1 and 2 establish the effect of replacing Isopar C, a hydrocarbon solvent, with a $C_{12}$ alpha-olefin in a system containing wax, mineral oil, and silicone film-formers. The application of each of the compositions to a wooden surface and visual observation of the cleaned and polished surfaces established that the composition containing the alpha-olefin (Example 2) provided improved leveling and, additionally, improved removal of oil-borne stains.

Examples 3 and 4 demonstrate the effect of replacing a hydrocarbon solvent with a $C_{12}$ alpha-olefin in a system utilizing silicone as the sole film-former. The application of each of the compositions to a wooden surface and visual observation of the cleaned and polished surfaces established that the composition containing the alpha-olefin (Example 4) provided improved leveling and cleaning characteristics.

Examples 5, 6 and 7 establish the effect of varying the concentration of the $C_{12}$ alpha-olefin in an otherwise identical composition. Example 5 contains no alpha-olefin, whereas Example 6 contains 3 percent alpha-olefin and Example 7 contains 5 percent alpha-olefin. The presence of the alpha-olefin in Examples 6 and 7, based on application of the compositions to a wooden surface and visual observation, established that the alpha-olefins in a concentration of 3 or 5 percent contributed to the leveling characteristics of the composition. The cleaning characteristics of the composition increased with increased concentration of the alpha-olefin.

In Example 8 the same formulation was used in a series of compositions, however replacing the $C_{12}$ alpha-olefin with alpha-olefins having a chain length of 8 carbon atoms, 10 carbon atoms, 14 carbon atoms, 16 carbon atoms, and 18 carbon atoms, respectively. The composition containing the $C_8$ alpha-olefin did not provide adequate cleaning or leveling. The compositions containing the $C_{10}$ to $C_{18}$ alpha-olefins all demonstrated adequate cleaning and leveling. The cleaning characteristics improved as the chain length increased. However, as the chain length increased, the film characteristics of the composition above $C_{12}$ became more glossy and demonstrated a greater tendency to smear. Above $C_{18}$, the smear characteristics detracted from use of the alpha-olefin in a cleaner-polish composition.

Example 9 established that when mineral oil was used to replace the alpha-olefin the resultant composition provided no cleaning with increased smear.

The composition of Example 10 established the effect of removing the silicone from the composition and utilizing as the sole film-former mineral oil. The gloss was lower when using mineral oil as the sole film-former. However, the cleaning and leveling characteristics of the composition were fully adequate.

The examples of Table II establish that the alpha-olefin as herein defined is compatible with water-in-oil or "oil-out" emulsion cleaner-polishes utilizing a variety of film-formers. The compositions of Examples 11 through 19 all had excellent cleaning and gloss characteristics. The examples of Table II establish that the compositions are readily adaptable for dispensing from an aerosol container.

In the examples of Tables I and II, various modifications can be made in the formulations within the context of the present disclosure. In the present specification, the invention has been described in relation to embodiments to illustrate the effect of the alpha-olefin in the composition. It will be apparent to those skilled in the art that various modifications can be made in the emulsion compositions without departing from the inventive concept as set forth herein.

It is claimed:

1. A surface-treating emulsion composition comprising from about 66 to 97 percent by weight water, from about 1 to 25 percent by weight of a hydrocarbon solvent having a kauri-butanol value within the range of about 20 to 50 and having a boiling range within the range of 80° to 200° C.; from 0.2 to 1.20 percent by weight surfactant, from about 1 to 5 percent by weight of a film-former, and from about 0.50 to 6.0 percent by weight of a monomeric alpha-olefin containing from 10 to about 18 carbon atoms.

2. The surface-treating emulsion composition of claim 1 wherein said emulsion is a water-out emulsion, and said emulsion contains from about 88 to 97 percent by weight water, 0.5 to 4 percent by weight hydrocarbon solvent, 0.6 to 1.20 percent by weight surfactant, 0.5 to 6 percent by weight alpha-olefin, and 1 to 4 percent by weight film-former.

3. The surface-treating emulsion composition of claim 2 wherein the alpha-olefin is 1-dodecene.

4. The surface-treating emulsion composition of claim 3 wherein said surfactant is non-ionic.

5. The surface-treating emulsion composition of claim 1 wherein said emulsion is a water-out emulsion and contains from 90 to 96 percent by weight water, 1 to 4 percent by weight hydrocarbon solvent, 0.6 to 1.20 percent by weight surfactant, 1 to 4 percent by weight film-former, and 2.5 to 6 percent by weight alpha-olefin.

6. The surface-treating emulsion composition of claim 5 wherein said alpha-olefin is a $C_{12}$ alpha-olefin.

7. The surface-treating emulsion composition of claim 6 wherein the film-former includes an organic polysiloxane.

8. The surface-treating emulsion composition of claim 6 wherein said film-former includes an organic polysiloxane and a wax.

9. The surface-treating emulsion composition of claim 6 wherein said film-former includes an organic polysiloxane and a mineral oil.

10. The surface-treating emulsion composition of claim 6 wherein said surfactant is non-ionic.

11. The surface-treating emulsion composition of claim 1 wherein said emulsion is an oil-out emulsion having from about 66 to 97 percent by weight water, 1 to 25 percent by weight hydrocarbon solvent, 0.5 to 1.20 percent by weight surfactant, 1 to 5 percent by weight film-former, and 2.5 to 6 percent by weight alpha-olefin.

12. In a surface-treating emulsion composition of the type comprising water, a hydrocarbon solvent, a surfactant, and a film-former, the improvement wherein said surface-treating emulsion composition includes from about 0.5 to 6 percent by weight of a monomeric alpha-olefin containing from about 10 to about 18 carbon atoms.

* * * * *